US010856075B2

(12) United States Patent
Sassi et al.

(10) Patent No.: US 10,856,075 B2
(45) Date of Patent: *Dec. 1, 2020

(54) AUDIO CAPTURE WITH MULTIPLE MICROPHONES

(71) Applicant: Nokia Technologies Oy, Espoo (FI)

(72) Inventors: Antti Heikki Tapio Sassi, Pirkkala (FI); Jari Petteri Sjoberg, Kangasala (FI); Ari Juhani Koski, Lempaala (FI); Anu Huttunen, Tampere (FI); Mari Partio, Pirkkala (FI); Riitta Niemisto, Tampere (FI); Jukka Vartiainen, Tampere (FI); Ville Mikael Myllyla, Tampere (FI); Jorma Makinen, Tampere (FI); Tero Takala, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 15/834,159

(22) Filed: Dec. 7, 2017

(65) Prior Publication Data

US 2018/0103317 A1 Apr. 12, 2018

Related U.S. Application Data

(63) Continuation of application No. 14/515,039, filed on Oct. 15, 2014, now Pat. No. 9,888,317.

(Continued)

(51) Int. Cl.
*H04R 3/00* (2006.01)
*H04M 1/60* (2006.01)
(Continued)

(52) U.S. Cl.
CPC .......... *H04R 3/002* (2013.01); *H04M 1/6008* (2013.01); *H04M 1/6041* (2013.01);
(Continued)

(58) Field of Classification Search
CPC .... H04R 3/002; H04R 3/005; H04R 2410/00; H04R 2410/01; H04R 2410/05;
(Continued)

(56) References Cited

U.S. PATENT DOCUMENTS 9,888,317 B2 *  2/2018  Sassi ................... H04M 1/6008
2009/0034752 A1 *  2/2009  Zhang .................. H04R 3/005
                                                                          381/92

(Continued)

FOREIGN PATENT DOCUMENTS

CN    201491082 U    5/2010
CN    201639630 U    11/2010
(Continued)

*Primary Examiner* — William A Jerez Lora
(74) *Attorney, Agent, or Firm* — Harrington & Smith

(57) ABSTRACT

An apparatus including at least one processor and at least one memory including computer program code configured to: when the apparatus is in a voice phone call mode of sound capture, output a signal from a first microphone as a primary speech signal, and select one or more second microphones to output a noise reduction signal, where the apparatus comprises at least two of the second microphones, and where selection of the one or more second microphones is based at least partially upon a determined use of the apparatus being either a handportable or an integrated handsfree use; and/or when the apparatus is in a multi-media mode of sound capture select one or more of the microphones to output audio signals based upon both a determined type of sound capture feature being used by the apparatus and based upon a determined orientation of the apparatus.

20 Claims, 4 Drawing Sheets

Related U.S. Application Data

(60) Provisional application No. 61/894,009, filed on Oct. 22, 2013.

(51) Int. Cl.
*H04M 1/725* (2006.01)
*G10L 21/0216* (2013.01)

(52) U.S. Cl.
CPC .... *H04R 3/005* (2013.01); *G10L 2021/02165* (2013.01); *H04M 1/72569* (2013.01); *H04R 2410/05* (2013.01); *H04R 2499/11* (2013.01); *H04S 2400/15* (2013.01)

(58) Field of Classification Search
CPC ............. H04R 2499/11; H04S 2400/00; H04S 2400/15; H04M 1/6008; H04M 1/6041; H04M 1/72569; G10L 2021/02165
USPC ......... 381/26, 71.1, 80, 81, 85, 91, 92, 94.1, 381/94.7, 111, 123, 124, 375
See application file for complete search history.

(56) References Cited

U.S. PATENT DOCUMENTS

| | | | |
|---|---|---|---|
| 2009/0190769 A1 | 7/2009 | Wang et al. | |
| 2010/0081487 A1* | 4/2010 | Chen | H04M 9/082 455/575.1 |
| 2010/0195838 A1 | 8/2010 | Bright | |
| 2012/0019689 A1* | 1/2012 | Zurek | H04R 3/005 348/240.99 |
| 2012/0128175 A1* | 5/2012 | Visser | H04R 3/005 381/92 |
| 2012/0195433 A1* | 8/2012 | Eppolito | H04S 3/008 381/1 |
| 2012/0224456 A1* | 9/2012 | Visser | G01S 15/876 367/127 |
| 2012/0284619 A1 | 11/2012 | Myllyla et al. | |
| 2013/0272540 A1 | 10/2013 | Ahgren et al. | |
| 2013/0275077 A1* | 10/2013 | Kim | G06F 3/04817 702/141 |
| 2013/0289368 A1* | 10/2013 | Covington | A61B 5/073 600/302 |
| 2013/0332156 A1* | 12/2013 | Tackin | G10L 25/78 704/226 |
| 2014/0071221 A1* | 3/2014 | Dave | H04R 1/02 348/14.02 |
| 2016/0173976 A1* | 6/2016 | Podhradsky | H04R 3/005 381/92 |

FOREIGN PATENT DOCUMENTS

| | | |
|---|---|---|
| CN | 201717913 U | 1/2011 |
| CN | 102165521 A | 8/2011 |
| CN | 102624961 A | 8/2012 |
| CN | 104618570 A | 5/2015 |
| WO | WO-2010/014074 A1 | 2/2010 |

\* cited by examiner

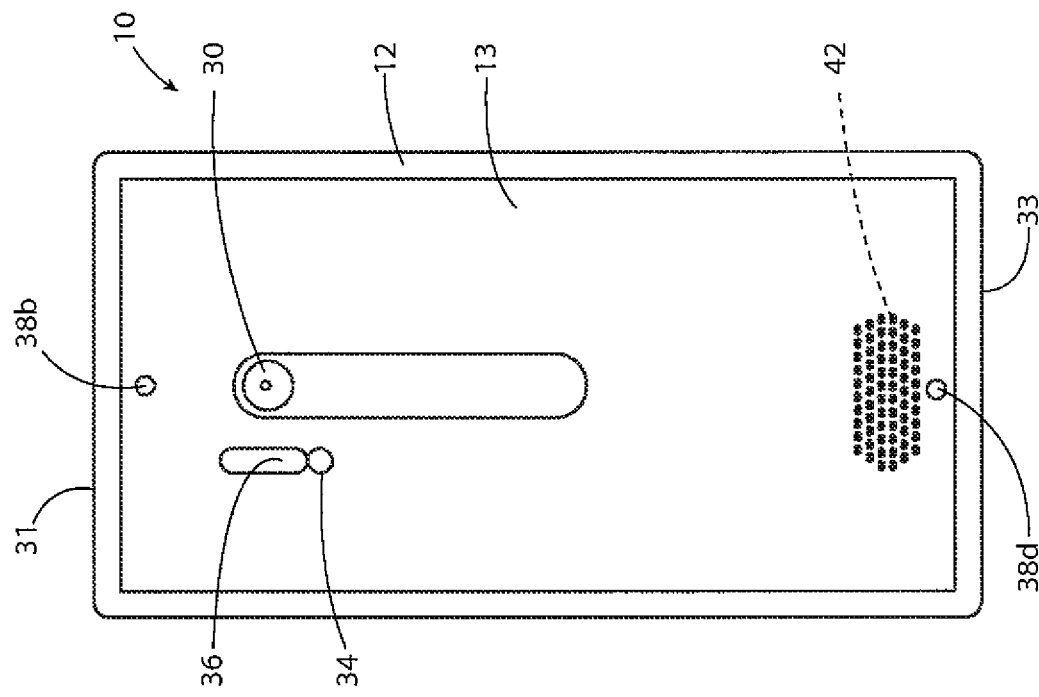
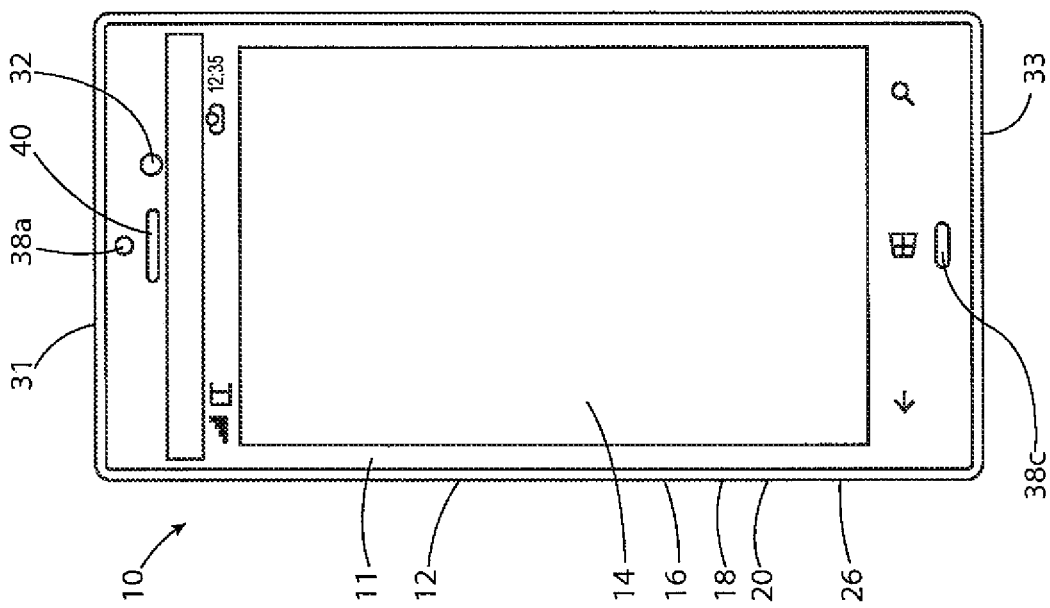

AUDIO CAPTURE WITH MULTIPLE MICROPHONES

CROSS REFERENCE TO RELATED APPLICATION

This application is a continuation patent application of copending application Ser. No. 14/515,039 filed Oct. 15, 2014 which claims the benefit of U.S. Provisional Application No. 61/894,009, filed Oct. 22, 2013, the disclosures of which are hereby incorporated by reference in their entireties.

BACKGROUND

Technical Field

The exemplary and non-limiting embodiments relate generally to audio and, more particularly, to using of different microphones of an apparatus for different use cases.

Brief Description of Prior Developments

Mobile telephone handsets are known which have multiple microphones.

SUMMARY

The following summary is merely intended to be exemplary. The summary is not intended to limit the scope of the claims.

In accordance with one aspect, an example embodiment is provided in an apparatus comprising at least one processor; and at least one non-transitory memory including computer program code, the at least one memory and the computer program code configured to, with the at least one processor, cause the apparatus at least to, when the apparatus is configured to transmit a sound source in a voice phone call mode, output at least one signal from at least one first microphone to the at least one processor as a primary speech signal, and output two or more signals from at least two or more second microphones to output a noise reduction signal to the at least one processor; and/or when the apparatus is configured to operate for sound capturing in a multi-media mode, output at least one signal from the same one or more of the first microphones, and two or more signals from the same at least two or more second microphones to the at least one processor.

In accordance with another example, a method comprises, when an apparatus is in a voice phone call mode, outputting a signal from at least one first microphone to the at least one processor as a primary speech signal, and outputting two or more signals from at least two or more second microphones of the apparatus to output a noise reduction signal to the at least one processor; and/or when the apparatus is in a multi-media mode, outputting at least one signal from the same one or more first microphones, and two or more signals from the same at least two or more second microphones to the at least one processor.

In accordance with another aspect, an example embodiment comprises a non-transitory program storage device readable by a machine, tangibly embodying a program of instructions executable by the machine for performing operations, the operations comprising, when an apparatus is in a voice phone call mode, outputting a signal from at least one first microphone to at least one processor as a primary speech signal, and outputting two or more signals from at least two or more second microphones of the apparatus to output a noise reduction signal to the at least one processor; and/or when the apparatus is in a multi-media mode, outputting at least one signal from the same one or more of the first microphones, and two or more signals from the same at least two or more second microphones to the at least one processor.

BRIEF DESCRIPTION OF THE DRAWINGS

The foregoing aspects and other features are explained in the following description, taken in connection with the accompanying drawings, wherein:

FIG. 1 is a front view of an example embodiment of an apparatus comprising features as described herein;

FIG. 2 is a rear view of the apparatus shown in FIG. 1;

DETAILED DESCRIPTION OF EMBODIMENTS

Figure 3:
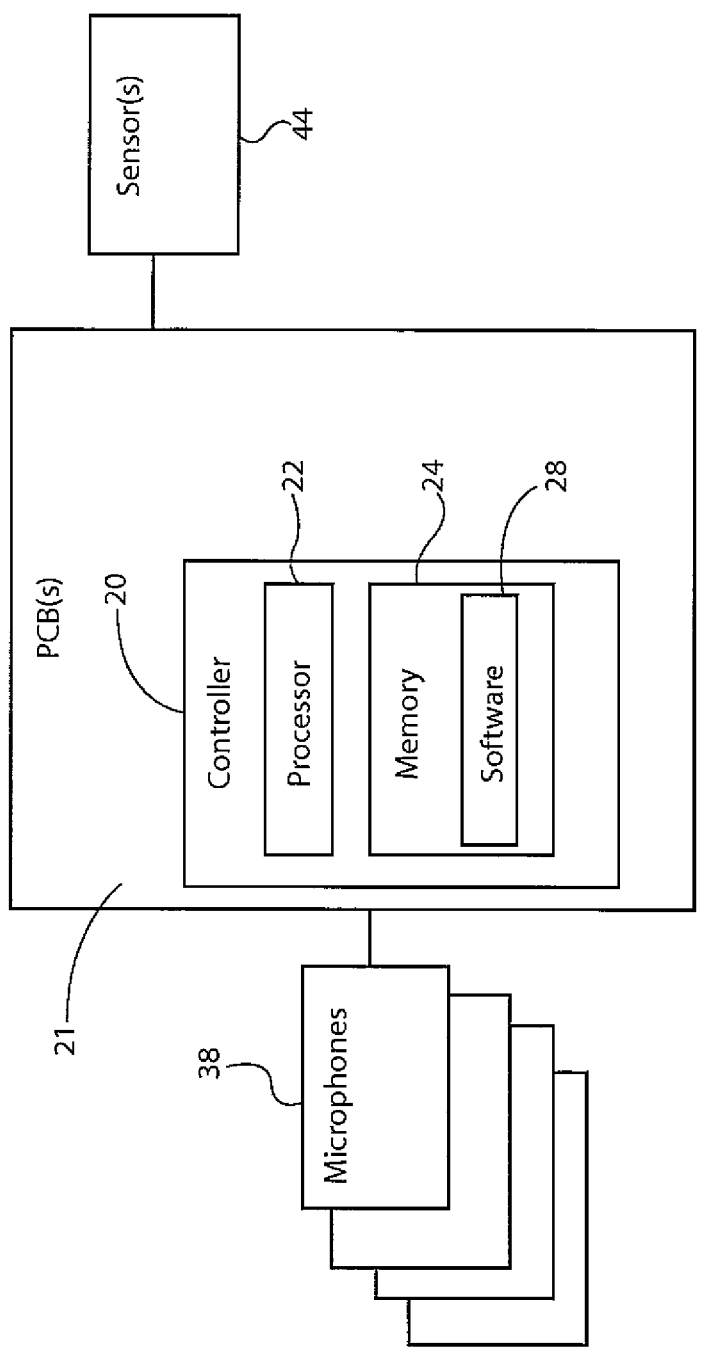
FIG. 3 is a diagram illustrating some of the components of the apparatus shown in FIGS. 1-2.

Referring to FIG. 1, there is shown a front view of an apparatus 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone.

Referring also to FIG. 2, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The touchscreen 14 is located at a front side 11 of the housing 12. The display 14 in this example is a capacitive touchscreen display which functions as both a display screen and as a user input. The user interface may also include a keypad or other user input device. Referring also to FIG. 3, the controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter 18 forma primary communications system to allow the apparatus 10 to communicate with a wireless telephone system, such as a mobile telephone base station for example.

In this example, the apparatus 10 includes the camera 30 which is located at the rear side 13 of the apparatus, a front camera 32, an LED 34, and a flash system 36. The LED 34 and the flash system 36 are also visible at the rear side of the apparatus, and are provided for the camera 30. The cameras 30, 32, the LED 34 and the flash system 36 are connected to the controller 20 such that the controller 20 may control their operation. In an alternate example embodiment the rear side may comprise more than one camera, and/or the front side could comprise more than one camera. The apparatus 10 includes a sound transducer provided as an earpiece 40, and a sound transducer provided as a speaker 42. More or less than one speaker may be provided.

The apparatus 10 includes a plurality of sound transducers provided as microphones 38. In this example embodiment the apparatus 10 has four (4) microphones. However, in an alternate embodiment more or less than four microphones may be provided. In this example, the microphones 38 are connected to the PCB 21, which connects the microphones to the controller 20.

Figure 4C:
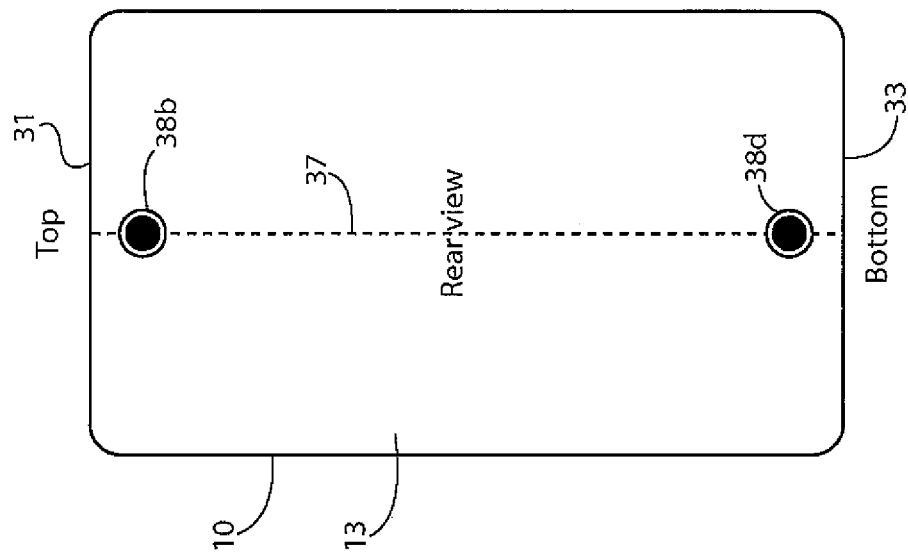
FIG. 4C is a schematic rear view of the apparatus shown in FIG. 1.
Figure 4B:
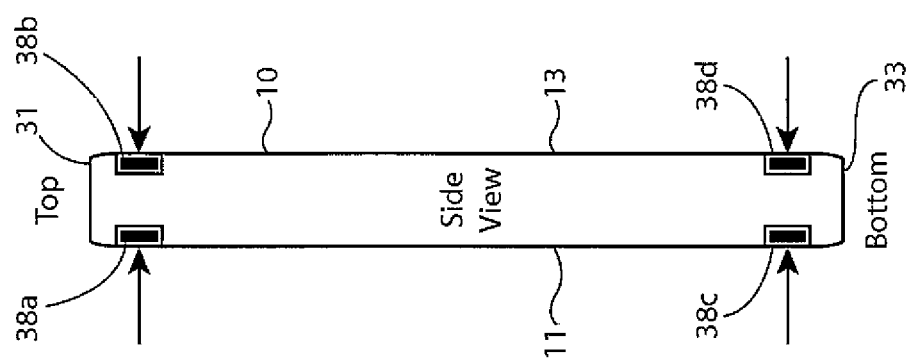
FIG. 4B is a schematic side view of the apparatus shown in FIG. 1.
Figure 4A:
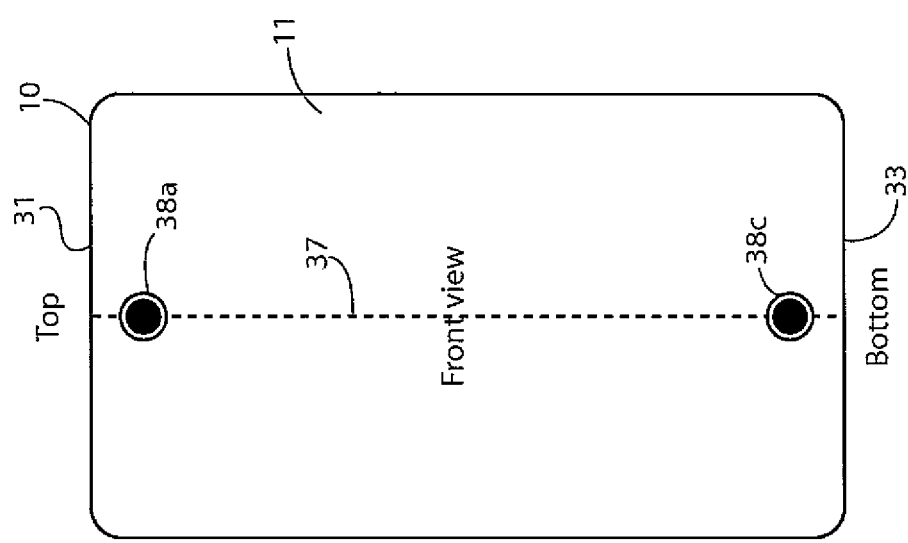
FIG. 4A is a schematic front view of the apparatus shown in FIG. 1.

Referring also to FIGS. 4A-4C, the apparatus 10 is shown schematically illustrating the general layout of its four microphones 38. The apparatus 10 has a general block shape with the front side 11, the rear side 13, a top 31 and a bottom 33. The four microphones 38 include a, front top microphone 38a, a rear top microphone 38b, a front bottom microphone 38c and a rear bottom microphone 38d. In this example the two front microphones 38a, 38c are aligned with a centerline 37 of the apparatus. However, the microphones could be at least partially offset from the centerline. Likewise, the two rear microphones 38b, 38d are aligned with the centerline 37 of the apparatus, but could be at least partially offset from the centerline.

The controller 20 is configured to selectively use the microphones based upon different circumstances and uses of the apparatus 10. Sometimes only one of the microphones might be used. Other times all of the microphones might be used. Features as described herein allow for selective use of different numbers of the microphones and different select ones of the microphones as better understood from the description below.

Features as described herein may be used, for example, with smartphone devices and portable audio devices such as a camera or video recorder. Features may be used with microphone integration for high quality audio capture and advanced communication audio. Features may be used to improve the perceived quality of captured audio and communication audio. Features may be used to optimize product design by cost and component count by providing optimal component locations, and by sharing use of components (microphones) for several use cases.

The example embodiments describe optimal microphone configurations for smartphones where at least 3 or 4 microphones are used for at least two different use cases such as multichannel, stereo and mono audio recording capability and advanced background, wind noise and echo reduction for uplink speech in telephony. The solution optimizes phone ergonomics, usability and recording and voice call performance. The microphone configuration may consist of different microphone pairs (where microphones functions can be shared between different pairs) or microphone groupings (as a combination of a microphone pair and one or more other microphones) that are used to implement different use cases such as directional stereo capture, enhanced handportable (HP) and speakerphone (IHF) calls in combination with conventional and spatial signal processing methods. FIGS. 1-4 is an example of symmetric microphone pairs (a 4-mic configuration).

The example embodiments relate to an integration of at least 3 microphones which are suitably located on an apparatus, such as a mobile phone for example, wherein the microphones provide respective output signals in at least one use case. All microphones are utilized for one or another number of different use cases, such as HandPortable (HP), Integrated HandsFree (IHF) and audio capture for multimedia for example.

When the apparatus 10 is in a voice phone call mode of sound capture, such as during a telephone conversation, the example apparatus 10 is configured to provide different types of uses including handportable (HP) use or integrated handsfree (IHF) use. Handportable (HP) use is when a phone call is being made with the apparatus/phone 10 being held against the ear of the user, where sound is output from apparatus/phone 10 via earpiece 40. Integrated handsfree (IHF) use is when a phone call is being made with the apparatus/phone 10 via the loudspeaker 42. Integrated handsfree (IHF) use includes Hand-held Handsfree (HHHF) use and Desktop Handsfree (DTHF) use call cases. Handheld Handsfree (HHHF) use is when a phone call is being made with the apparatus/phone 10 while holding phone 10 in a hand of the user, where sound is output via IHF loudspeaker 42. Desktop Handsfree (DTHF) use is when a phone call is being made with the apparatus/phone 10 while the phone 10 is placed on a surface, such as a table for example, where sound is output via IHF loudspeaker 42.

The apparatus 10 is configured to output a signal from a first microphone 38c as a primary speech signal from the user of the apparatus during HP use. When the apparatus 10 is in a voice phone call mode of sound capture the apparatus 10 is configured to determine in which of the different types of uses the apparatus 10 is being used; HP or IHF and perhaps HHHF or DTHF. With this information, the apparatus 10 is configured to select one or more second ones of the microphones 38a, 38b, 38d to output a noise reduction signal to be used by the electronics to reduce noise. Thus, selection of the one or more second microphones 38a, 38b, 38d is based, at least partially, upon a determined use of the apparatus 10 being either a handportable use or an integrated handsfree use. If the use is an integrated handsfree use, the apparatus may be configured to select one or more second microphones 38a, 38b, 38d based, at least partially, upon a determined use of the apparatus 10 being either HHHF or DTHF. Determining if the use is either HP or IHF is relatively simple, such as based upon whether or not the speaker 42 is being used. Typically the user selects the IHF mode (speakerphone) explicitly from the phone call user interface (UI), although it could be done also automatically, e.g. using a proximity sensor or other sensor(s) to determine the phone position. For determining if the use is either HHHF or DTHF the apparatus may use one or more sensors 44 such as an orientation sensor, a motion sensor and/or a touch sensor for example.

With the voice phone call mode of sound capture having been determined, the apparatus 10 is configured to select the microphone(s) 38 to be used for that determined mode of sound capture. For example, for Handportable (HP) uplink noise reduction, the apparatus may select the front bottom microphone 38c and the rear bottom microphone 38d and the rear top microphone 38d to output audio signals, but not the front top microphone 38a (or at least not use any audio signal from the front top microphone 38a). Because the front top microphone 38a might be covered or interfered with by the user's ear, the apparatus 10 is configured to not use this microphone in the HP mode of use. Also, if the sound transducer 40 is also the microphone 38a, then that sound transducer could not be used during a HP mode of use because it needs to be used as an earpiece.

A noise reduction algorithm in the apparatus may be used, with the signals from the three microphones 38c, 38d and 38b to reduce ambient noise pickup of the microphones in the handportable call. This solution may be based on adaptive filtering and use of fixed microphone beam. As another example, for Hand-held speakerphone uplink noise reduction, the apparatus may select the following groups of microphones to output audio signals for noise reduction:

the front top microphone 38a, the rear top microphone 38b and the front bottom microphone 38c (but not the rear bottom microphone 38d), or the front bottom microphone 38c, the rear bottom microphone 38d and the front top microphone 38a (but not the rear top microphone 38b), or the front bottom microphone 38c, the rear bottom microphone 38d and the rear top microphone 38b (but not the front top microphone 38a), or the front bottom microphone 38c, the rear bottom microphone 38d, the front top microphone 38a and the rear top microphone 38d.

A noise reduction algorithm in the apparatus may be used, with the signals from the two microphones 38a and 38b to reduce ambient noise pickup of the microphone in the hand-held speakerphone call. This solution may be based on use of moving beam and adaptive filtering.

As another example, for Desktop speakerphone uplink noise reduction the apparatus may select the following groups of microphones to output audio signals for noise reduction:

the front top microphone 38a, the rear top microphone 38b and the front bottom microphone 38c (but not the rear bottom microphone 38d), or the front bottom microphone 38c, the rear bottom microphone 38d and the front top microphone 38a (but not the rear top microphone 38d), or the front bottom microphone 38c, the rear bottom microphone 38d and the rear top microphone 38b (but not the front top microphone 38a), or the front bottom microphone 38c, the rear bottom microphone 38d, the front top microphone 38a and the rear top microphone 38b.

A noise reduction algorithm in the apparatus may be used, with the signals from the sole microphone 38a to reduce ambient noise pickup of the microphone in the desktop speakerphone call. This solution may be based on moving beam and adaptive filtering.

As noted above, besides a voice phone call mode of sound capture, the apparatus may be used hi a multi-media mode of sound capture, such as when video is being recorded by the camera(s) 30, 32 for example. When the apparatus 10 is in a multi-media mode of sound capture, the apparatus is configured to determine the type of sound capture feature being used by the apparatus. Different types of sound capture features during a multi-media mode of sound capture may comprise, for example, Mono audio capture, Mono Zoom audio capture, stereo capture, directional stereo capture, surround capture and wind noise reduction. Mono audio capture is capture of sound during normal monoaural sound recording without any special features. Mono zoom audio capture is capture of sound during mono aural sound recording, but when the camera 30 has been zoomed. The other features described above (stereo capture, directional stereo capture, surround capture and wind noise reduction) should be understood by a person skilled in the art.

The determination of type of sound capture feature being used by the apparatus during a multi-media mode of sound capture may be based upon user selected settings of the apparatus (such as when Zoom is actuated for example). Once the type of sound capture feature being used by the apparatus during a multi-media mode of sound capture has been determined, the apparatus 10 is configured to select which of the microphone(s) 38 to be used for that determined type of sound capture feature. For example, with the Mono audio capture feature the apparatus 10 may be configured to only select the rear top microphone 38b to output an audio signal. Sound may be captured with an omni-directional polar pattern in mono, and sound source directions are not separated.

In the example embodiment shown, in addition to using the determined type of sound capture feature, the selection of which microphones to use may be also based upon at least one other parameter. In this particular example the additional parameter is a determined orientation of the apparatus 10, such as portrait or landscape. The chart below gives some examples of how the apparatus may be programmed to select and use the different microphones for the different features:

| Feature | Orientation | Recommended microphones | Description |
| --- | --- | --- | --- |
| Mono | Portrait or Landscape | Rear top 38b | Captures sound with omni-directional polar pattern in mono. Sound source directions are not separated. |
| Mono Zoom | Portrait | Rear top 38b and front top 38a | Captures sound primarily from the direction of video shooting in mono. |
|  | Landscape | Rear top 38b and front top 38a (and rear bottom 38d and front bottom 38c) | Attenuates unwanted sounds from opposite and surrounding directions. (Possible improvements for the performance in landscape orientation when using both microphone pairs in top and bottom) |
| Stereo Capture | Landscape | Rear top 38b and Rear bottom 38d | Captures sound with omni-directional polar patterns in stereo. Stereo image depending on, inter alia, the distance between the microphones. |
| Directional stereo capture | Portrait | N/A |  |
|  | Landscape | Rear top 38b and front top 38a and rear bottom 38d and front bottom 38c | Captures sound with directional polar patterns in stereo. Provides improved front-back separation compared to conventional omni-directional stereo recording reference. (Possible benefit of the mono zoom in portrait use). |
| Surround capture | Portrait | N/A |  |
|  | Landscape | Rear top 38b and Rear bottom 38d and Front bottom 38c OR Rear top 38b and Front top 38a and Rear | Captures sound in surround by identifying direction of sounds and mapping them into 5.1 speaker configuration. Basic performance depends on the quality of the stereo recording, third microphone defines the |

| Feature | Orientation | Recommended microphones | Description |
|---|---|---|---|
| | | bottom 38d | directions of the sound sources. |
| | Portrait | N/A | |
| Wind noise reduction | Landscape | Stereo: Rear top 38b and rear bottom 38d mics with (Front top 38a OR front bottom 38c) | Wind noise reduction reduces the wind noise in the recording. Wind noise reduction refers to the use of the microphone switching between the front and rear microphone components (opposite to each other) in combination with high-pass filtering. |
| | Portrait | N/A | |

Thus, during a HP call all four microphones may be selectively used in a following manner:
  microphone 38b provides the far field noise reduction noise reference signal
  microphone 38a is used to form a beam with microphone 38b for more accurate noise reference
  microphone 38d is used for near field noise reduction algorithm noise reference signal
  microphone 38c is used for the primary speech signal
  microphone 38d is used to form a beam with microphone 38c for the primary speech signal Thus, during a IHF call all four microphones may be selectively used in a following manner:
  microphone 38d provides a reference signal for the Acoustic Echo Cancelling algorithm (improves echo cancelling/double talk)
    This reference signal is much more realistic (natural distortion from the IHF speaker mechanics) than electrical reference signal from amplifier or digital reference from DSP
  microphone 38c is used for the background noise reference
  microphone 38b is used for the background noise reference
  microphone 38a is used for the primary speech signal
  microphone 38b is used to form a beam with microphone 38a for the primary speech signal Thus, for Video-recording/Audio-capture all four microphones may be selectively used in a following manner:
  microphone 38b and microphone 38a form a beam for the Left signal
  microphone 38d and microphone 38c form a beam for the Right signal
  microphone 38a or microphone 38c is used for measuring the time difference which enables algorithms to create 5.1/6.1/7.1 multi-channel audio capture The above described example using four (4) suitably positioned microphones may provide:
  Stereo and multi-channel audio capture
  Beam forming for multiple speech cases and audio capture
  Naturally distorted echo reference from the speaker for IHF call Acoustic Echo Cancelling (a microphone should be placed nearby the speaker sound outlet to pick up the reference signal)
  Near and Far field noise references for Ambient noise reduction algorithms (Two different sources for ambient noise gives better starting point for the Background noise reduction algorithm to distinguish the noise from actual speech signal)

For a HP call, features as described herein improve the background noise cancellation (operator requirements) improves user experience because a product's uplink signal contains less of the environmental noise and the voice quality is therefore clearer to understand. Forming a beam for a speech (or noise reference) signal improves the performance in a sense that directivity of the signal becomes greater. With more directivity, the signal is picked up better (the ratio for the wanted signal versus unwanted environmental sound).

For a IHF call, features as described herein improve Acoustic Echo Cancelling providing a better user experience and double talk attenuation. Basically the conversation is more natural for both near-end and far-end users. Features also improve the background noise cancellation (operator requirements) and improve user experience as product's uplink signal contains less of the environmental noise and the voice quality is therefore clearer to understand. Forming a beam for a speech (or noise reference) signal improves the performance in a sense that directivity of the signal is greater. With more directivity, the signal picks up better ratio for the wanted signal versus unwanted environmental sound.

For audio capture during a multi-media mode, features as described herein improve audio capture providing a multi-channel recording where the recorded signal content is enhanced. The recording can be reproduced in multi-channel audio equipment (for example home theater or capable headset) and the playback experience is richer.

Figure 5C:
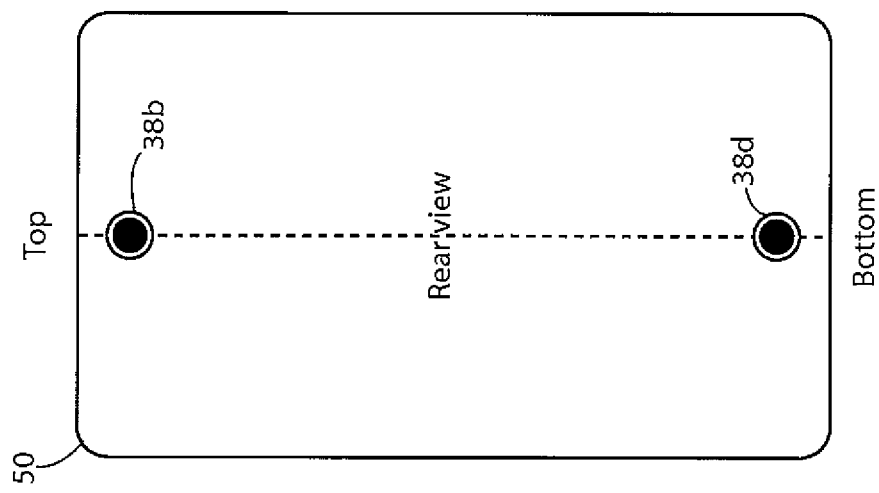
FIG. 5C is a schematic rear view of the apparatus shown in FIG. 5A.
Figure 5B:
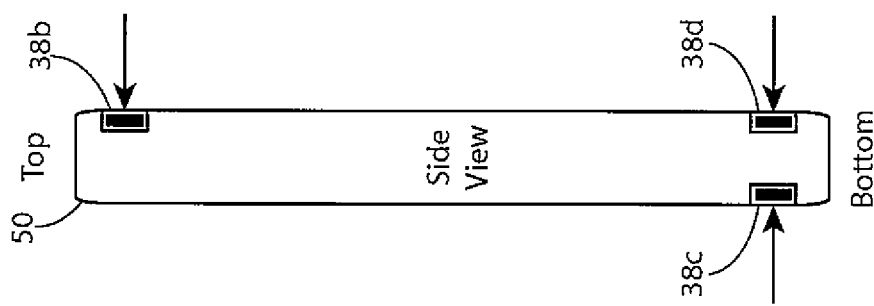
FIG. 5B is a schematic side view of the apparatus shown in FIG. 5A.
Figure 5A:
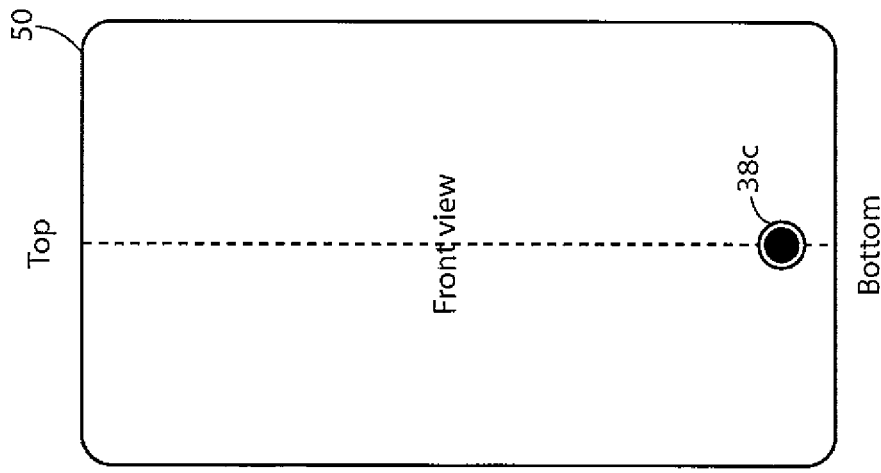
FIG. 5A is a schematic front view of an alternate example of the apparatus shown in FIG. 1.

Referring also to FIGS. 5A-5C, another example embodiment is shown. In this example the apparatus 50 is a smartphone exactly the same as the apparatus 10, but with the difference that only three microphones 38 are provided rather than four microphones. In this embodiment the apparatus comprises the rear top microphone 38b, the front bottom microphone 38c and the rear bottom microphone 38d.

As an example, for Hand-held speakerphone uplink noise reduction, the apparatus may select the following groups of microphones to output audio signals for noise reduction: the front bottom microphone 38c, the rear bottom microphone 38d and the rear top microphone 38b. A noise reduction algorithm in the apparatus may be used, with the signals from the two microphones 38d and 38b to reduce ambient noise pickup of the microphone in the hand-held speakerphone call. This solution may be based on use of moving beam and adaptive filtering.

As another example, for Desktop speakerphone uplink noise reduction the apparatus may select the following groups of microphones to output audio signals for noise reduction the rear top microphone 38b, the front bottom microphone 38c and the rear bottom microphone 38d. A noise reduction algorithm in the apparatus may be used, with the signals from the sole microphone 38c to reduce ambient noise pickup of the microphone in the desktop speakerphone call. This solution may be based on moving beam and adaptive filtering.

The chart below gives some examples of how the apparatus 50 may be programed to select and use the different microphones for the different features during a voice phone call mode of sound capture:

| Feature | Orientation | Recommended microphones | Description |
| --- | --- | --- | --- |
| Mono | Portrait or Landscape | Rear top 38b | Captures sound with omni-directional polar pattern in mono. Sound source directions are not separated. |
| Mono Zoom | Portrait | N/A | |
| | Landscape | Rear bottom 38d and rear top 38b | Captures sound primarily from the direction of video shooting in mono. Attenuates unwanted sounds from opposite and surrounding directions. |
| Stereo Capture | Landscape | Rear top 38b and Rear bottom 38d | Captures sound with omni-directional polar patterns in stereo. Stereo image depending on, inter alia, the distance between the microphones. |
| | Portrait | N/A | |

The chart below gives some examples of how the apparatus 50 may be programed to select and use the different microphones for the different features during a multi-media mode of sound capture:

| Feature | Orientation | Recommended microphones | Description |
| --- | --- | --- | --- |
| Mono | Portrait or Landscape | Rear top 38b | Captures sound with omni-directional polar pattern in mono. Sound source directions are not separated. |
| Mono Zoom | Portrait | N/A | Captures sound primarily from the direction of video shooting in mono. Attenuates unwanted sounds from opposite and surrounding directions. |
| | Landscape | Rear bottom 38d and rear top 38b | |
| Stereo Capture | Landscape | Rear top 38b and Rear bottom 38d | Captures sound with omni-directional polar patterns in stereo. Stereo image depending on, inter alia, the distance between the microphones. |
| | Portrait | N/A | |
| Directional stereo capture | Landscape | N/A | Captures sound with directional polar patterns in stereo. Provides improved front-back separation compared to conventional omni-directional stereo recording reference. (Possible benefit of the mono zoom in portrait use). |
| | Portrait | N/A | |
| Surround capture | Landscape | Top rear 38b and bottom rear 38d and front bottom 38c | Captures sound in surround by indentifying direction of sounds and mapping them into 5.1 speaker configuration. Basic performance depends on the quality of the stereo recording, third microphone defines the directions of the sound sources. |
| | Portrait | N/A | |
| Wind noise reduction | Landscape | N/A | Wind noise reduction reduces the wind noise in the recording. Wind noise reduction refers to the use of the microphone switching between the front and rear microphone components (opposite to each other) in combination with high-pass filtering. |
| | Portrait | N/A | |

An example embodiment may be provided in an apparatus comprising at least one processor and at least one non-transitory memory including computer program code, the at least one memory and the computer program code configured to, with the at least one processor, cause the apparatus at least to, when the apparatus is in a voice phone call mode of sound capture, output a signal from a first microphone as a primary speech signal, and select one or more second microphones to output a noise reduction signal, where the apparatus comprises at least two of the second microphones, and where selection of the one or more second microphones is based at least partially upon a determined use of the apparatus being either a handportable use or an integrated handsfree use; and/or, when the apparatus is in a multi-media mode of sound capture, select one or more of the microphones to output audio signals based, at least partially, upon both a determined type of sound capture feature being used by the apparatus, where the apparatus comprises a plurality of different types of sound capture features, and based upon a determined orientation of the apparatus.

When the determined use of the apparatus is the handportable use, the apparatus may be configured to select a front bottom microphone, a rear bottom microphone and a rear top microphone as the selected one or more second microphones. When the determined use of the apparatus is the integrated handsfree use, selection of the one or more second microphones may be based at least partially upon a determined use of the apparatus being either a handheld handsfree use or a desktop handsfree use. When the determined use of the apparatus is the handheld handsfree use, the apparatus may be configured to select a front top microphone and a rear top microphone as the selected one or more second microphones. When the determined use of the apparatus is the desktop handsfree use, the apparatus may be configured to select a front top microphone as the selected one or more second microphones. The determined orientations of the apparatus may comprise a portrait orientation and a landscape orientation. The different types of sound capture features may comprise two of more of: mono audio capture, mono zoom audio capture, stereo capture, directed stereo capture, surround capture and wind noise reduction. When the determined type of sound capture feature is mono audio capture, the apparatus may be configured to select a rear top microphone as the selected one or more microphones, and when the determined type of sound capture feature is mono zoom audio capture, and when the determined orientation is a portrait orientation, the apparatus may be configured to select a rear top microphone and a front top microphone, or a rear bottom microphone and a front bottom microphone, as the selected one or more microphones, and when the determined type of sound capture feature is mono zoom audio capture, and when the determined orientation is a landscape orientation, the apparatus may be configured to select a rear top microphone and a front top microphone, and/or a rear bottom microphone and a front bottom microphone, as the selected one or more microphones. When the determined type of sound capture feature is stereo capture, and when the determined orientation is a landscape orientation, the apparatus may be configured to select a rear top microphone and a rear bottom microphone as the selected one or more microphones. When the determined type of sound capture feature is directional stereo capture, and when the determined orientation is the landscape orientation, the apparatus may be configured to select the rear top microphone, a front top microphone, the rear bottom microphone and a front bottom microphone as the selected one or more microphones. When the determined type of sound capture feature is surround capture, and when the determined orientation is the landscape orientation, the apparatus may be configured to select a rear top microphone, a front top microphone and a rear bottom microphone as the selected one or more microphones, and/or the rear top microphone, the rear bottom microphone and a front bottom microphone as the selected one or more microphones. When the determined type of sound capture feature is wind noise reduction, and and when the apparatus has four or more microphones, when the determined orientation is the landscape orientation, the apparatus may be configured to select a rear top microphone, a rear bottom microphone and a front top microphone or a front bottom microphone as the selected one or more microphones. The apparatus 10 may comprise means for selectively using microphones based upon a determined type of sound capture feature being used by an apparatus, where the apparatus comprises a plurality of different types of sound capture features, and based upon a determined orientation of the apparatus; and/or a determined mode of use of the apparatus while the apparatus is in a voice phone call mode of sound capture. The apparatus may further comprise a housing; at least one printed circuit board in the housing, where the at least one printed circuit board comprises the at least one processor and the at least one memory; at least one transmitter and at least one receiver connected to the at least one printed circuit board; an electronic display connected to the housing; and a battery connect to the at least one printed circuit board.

An example method may comprise, when an apparatus is in a voice phone call mode of sound capture, outputting a signal from a first microphone as a primary speech signal, and selecting one or more second microphones of the apparatus to output a noise reduction signal, where the apparatus comprises at least two of the second microphones, and where selection of the one or more second microphones is based at least partially upon a determined use of the apparatus being either a handportable use or an integrated handsfree use; and/or, when the apparatus is in a multi-media mode of sound capture, selecting one or more of the microphones to output audio signals based, at least partially, upon both a determined type of sound capture feature being used by the apparatus, where the apparatus comprises a plurality of different types of sound capture features, and based upon a determined orientation of the apparatus.

When the determined use of the apparatus is the handportable use, the method may comprise selecting a front bottom microphone, a rear bottom microphone and a rear top microphone as the selected one or more second microphones. When the determined use of the apparatus is the integrated handsfree use, the method may comprise selecting the one or more second microphones based at least partially upon a determined use of the apparatus being either a handheld handsfree use or a desktop handsfree use. When the determined use of the apparatus is the handheld handsfree use, the method may comprise selecting a front top microphone and a rear top microphone as the selected one or more second microphones; and when the determined use of the apparatus is the desktop handsfree use, the method may comprise selecting a front top microphone as the selected one or more second microphones. The determined orientations of the apparatus may comprise a portrait orientation and a landscape orientation, and the different types of sound capture features comprise two of more of: mono audio capture, mono zoom audio capture, stereo capture, directed stereo capture, surround capture and wind noise reduction.

An example embodiment may comprise a non-transitory program storage device such as memory 24 for example, readable by a machine 10, tangibly embodying a program of instructions executable by the machine for performing operations, the operations comprising, when an apparatus is in a voice phone call mode of sound capture, outputting a signal from a first microphone as a primary speech signal, and selecting one or more second microphones of the apparatus to output a noise reduction signal, where the apparatus comprises at least two of the second microphones, and where selection of the one or more second microphones is based at least partially upon a determined use of the apparatus being either a handportable use or an integrated handsfree use; and/or, when the apparatus is in a multi-media mode of sound capture, selecting one or more of the microphones to output audio signals based, at least partially, upon both a determined type of sound capture feature being used by the apparatus, where the apparatus comprises a plurality of different types of sound capture features, and based upon a determined orientation of the apparatus.

An example embodiment may comprise apparatus including at least one processor; and at least one non-transitory memory including computer program code, the at least one memory and the computer program code configured to, with the at least one processor, cause the apparatus at least to: when the apparatus is configured to transmit a sound source in a voice phone call mode, output at least one signal from at least one first microphone to the at least one processor as a primary speech signal, and output two or more signals from at least two or more second microphones to output a noise reduction signal to the at least one processor; and/or when the apparatus is configured to operate for sound capturing in a multi-media mode, output at least one signal from the same one or more of the first microphones, and two or more signals from the same at least two or more second microphones to the at least one processor.

An example method may comprise, when an apparatus is in a voice phone call mode, outputting a signal from at least one first microphone to the at least one processor as a primary speech signal, and outputting two or more signals from at least two or more second microphones of the apparatus to output a noise reduction signal to the at least one processor; and/or when the apparatus is in a multi-media mode, outputting at least one signal from the same one or more first microphones, and two or more signals from the same at least two or more second microphones to the at least one processor.

An example embodiment may comprise a non-transitory program storage device readable by a machine, tangibly embodying a program of instructions executable by the machine for performing operations, the operations comprising when an apparatus is in a voice phone call mode, outputting a signal from at least one first microphone to at least one processor as a primary speech signal, and outputting two or more signals from at least two or more second microphones of the apparatus to output a noise reduction signal to the at least one processor; and/or when the apparatus is in a multi-media mode, outputting at least one signal from the same one or more of the first microphones, and two or more signals from the same at least two or more second microphones to the at least one processor.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
a housing;
at least three microphones suitably located connected to the housing so as to enable usage of the at least three microphones in at least two different use cases comprising: a first use case and a second use case, wherein each of the at least three microphones is selectively used in the apparatus in each of the at least two different use cases based on an enabled use case, wherein the first use case is configured to provide communication audio and the second use case is configured to provide audio capture;
at least one processor; and
at least one non-transitory memory including computer program code, the at least one non-transitory memory and the computer program code configured to, with the at least one processor, cause the apparatus at least to:
 determine one of the first or the second use cases in which the apparatus is operating; and
 select each of the at least three microphones for use in the determined first or second use case based, at least partially, on:
  one or more predetermined signal roles associated with the determined first or second use case, wherein a signal from each respective one of the at least three microphones is used for at least one of the one or more predetermined signal roles, and
  at least one feature from a plurality of selectable features for the determined first or second use case, wherein the at least one feature is enabled by the apparatus, according to a selection of the at least one feature, based, at least partially, on the suitably located at least three microphones of the apparatus.

2. The apparatus as in claim 1, wherein the at least one non-transitory memory and the computer program code are configured to, with the at least one processor, cause the apparatus at least to:
determine a sound capture feature, as the at least one feature, based on at least one of:
 an indication of a user input,
 an orientation of the apparatus, or
 a motion of the apparatus.

3. The apparatus as in claim 1, wherein at least one of:
each of the at least three microphones is used during at least one respective time instance when the apparatus is operating in the determined first or second use case, where the at least three microphones are not simultaneously used during the at least one respective time instance; or
the at least three microphones are simultaneously used during at least one different time instance when the apparatus is operating in the determined first or second use case.

4. The apparatus as in claim 1, wherein the at least one non-transitory memory and the computer program code are configured to, with the at least one processor, cause the apparatus at least to:
switch the use of one or more of the at least three microphones while the apparatus is operating in the determined first or second use case based upon at least one of:
 a user input,
 an orientation of the apparatus, or
 a motion of the apparatus.

5. The apparatus as in claim 1, wherein the at least one feature comprises a feature determined to be available based, at least partially, on a total number of microphones of the at least three microphones and wherein:
the plurality of selectable features for the first use case comprise at least one of:
 a handportable feature,
 a desktop handsfree feature, or
 a handheld handsfree feature; and
the plurality of selectable features for the second use case comprise at least two or more of:
 a mono audio capture feature,
 mono zoom audio capture feature,
 stereo capture feature,
 directed stereo capture feature,
 surround capture feature, or
 wind noise reduction feature.

6. The apparatus as in claim 1, wherein, when the determined first or second use case is the first use case, the selecting of each of the at least three microphones is for at least one of:
primary speech;
near-field noise reduction;
far-field noise reduction; or
beamforming.

7. The apparatus as in claim 6, wherein a group of microphones of the at least three microphones are selected for one of the:
primary speech;
near-field noise reduction;
far-field noise reduction; or
beamforming.

8. The apparatus as in claim 1, wherein the determining of the one of the first and second use cases in which the apparatus is operating is based on a software application of the apparatus.

9. The apparatus as in claim 1, wherein each of the at least three microphones are positioned at different positions on the apparatus and wherein the selecting of each of the at least three microphones for use in the determined first or second use case is further based on an orientation of the apparatus being a landscape orientation or a portrait orientation.

10. The apparatus as in claim 1, further comprising:
at least one printed circuit board in the housing, where the at least one printed circuit board comprises the at least one processor and the at least one non-transitory memory;
at least one transmitter and at least one receiver connected to the at least one printed circuit board;
an electronic display connected to the housing; and
a battery connected to the at least one printed circuit board.

11. A method comprising:
   determining one of a first or a second use cases in which an apparatus is operating, wherein the apparatus comprises a housing and at least three microphones suitably located connected to the housing so as to enable usage of the at least three microphones in at least two different use cases, comprising: the first use case and the second use case, wherein each of the at least three microphones is selectively used in the apparatus in each of the at least two different use cases based on an enabled use case, and wherein the first use case is configured to provide communication audio and the second use case is configured to provide audio capture; and
   selecting each of the at least three microphones for use in the determined first or second use case based, at least partially, on:
      one or more predetermined signal roles associated with the determined first or second use case, wherein a signal from each respective one of the at least three microphones is used for at least one of the one or more predetermined signal roles, and
      at least one feature from a plurality of selectable features for the determined first or second use case, wherein the at least one feature is enabled by the apparatus, according to a selection of the at least one feature, based, at least partially, on the suitably located at least three microphones of the apparatus.

12. The method as in claim 11, further comprising:
   determining a sound capture feature, as the at least one feature, based on at least one of:
      an indication of a user input,
      an orientation of the apparatus, or
      a motion of the apparatus.

13. The method as in claim 11, wherein at least one of:
   each of the at least three microphones is used during at least one respective time instance when the apparatus is operating in the determined first or second use case, where the at least three microphones are not simultaneously used during the at least one respective time instance; or
   the at least three microphones are simultaneously used during at least one different time instance when the apparatus is operating in the determined first or second use case.

14. The method as in claim 11, further comprising:
   switching the use of one or more of the at least three microphones while the apparatus is operating in the determined first or second use case based upon at least one of:
      a user input,
      an orientation of the apparatus, or
      a motion of the apparatus.

15. The method as in claim 11, wherein:
   the plurality of selectable features for the first use case comprise at least one of:
      a handportable feature,
      a desktop handsfree feature, or
      a handheld handsfree feature; and
   the plurality of selectable features for the second use case comprise at least two or more of:
      a mono audio capture feature,
      mono zoom audio capture feature,
      stereo capture feature,
      directed stereo capture feature,
      surround capture feature, or
      wind noise reduction feature.

16. The method as in claim 11, wherein, when the determined first or second use case is the first use case, the selecting of each of the at least three microphones is for at least one of:
   primary speech;
   near-field noise reduction;
   far-field noise reduction; or beamforming.

17. The method as in claim 16, wherein a group of microphones of the at least three microphones are selected for one of the:
   primary speech;
   near-field noise reduction;
   far-field noise reduction; or
   beamforming.

18. The method as in claim 11, wherein the determining of the one of the first or the second use cases in which the apparatus is operating is based on a software application of the apparatus.

19. The method as in claim 11, wherein each of the at least three microphones are positioned at different positions on the apparatus.

20. A computer program product comprising a computer-readable medium bearing computer program code embodied therein which when executed with an apparatus, causes the apparatus to perform:
   determining one of a first or a second use cases in which the apparatus is operating, wherein the apparatus comprises a housing and at least three microphones suitably located connected to the housing so as to enable usage of the at least three microphones in at least two different use cases, comprising: the first use case and the second use case, wherein each of the at least three microphones is selectively used in the apparatus in each of the at least two different use cases based on an enabled use case, and wherein the first use case is configured to provide communication audio and the second use case is configured to provide audio capture; and
   selecting each of the at least three microphones for use in the determined first or second use case based, at least partially, on:
      one or more predetermined signal roles associated with the determined first or second use case, wherein a signal from each respective one of the at least three microphones is used for at least one of the one or more predetermined signal roles, and
      at least one feature from a plurality of selectable features for the determined first or second use case, wherein the at least one feature is enabled by the apparatus, according to a selection of the at least one feature, based, at least partially, on the suitably located at least three microphones of the apparatus.

* * * * *